United States Patent [19]

Wisbey et al.

[11] 4,406,976

[45] Sep. 27, 1983

[54] DISCHARGE LAMP BALLAST CIRCUIT

[75] Inventors: Robert W. Wisbey, Arlington Heights; Joseph S. Droho, Chicago, both of Ill.

[73] Assignee: 501 Advance Transformer Company, Chicago, Ill.

[21] Appl. No.: 249,282

[22] Filed: Mar. 30, 1981

[51] Int. Cl.$^3$ ....................... H02H 3/20; H05B 37/02; H05B 41/14

[52] U.S. Cl. .................................... 315/309; 315/290; 315/289; 315/244; 315/245; 315/127; 361/91

[58] Field of Search ............... 315/244, 245, 289, 290, 315/101, 106, 119, 309; 328/7; 307/326; 361/91; 338/20, 21

[56] References Cited

U.S. PATENT DOCUMENTS 2,409,150 10/1946 Rice ................................. 338/21 X 4,253,043 2/1981 Chermin et al. ................ 315/101 X

FOREIGN PATENT DOCUMENTS 45-20449 5/1970 Japan .................................. 315/309

*Primary Examiner*—Eugene La Roche

*Assistant Examiner*—Vincent DeLuca

*Attorney, Agent, or Firm*—Robert T. Mayer; Bernard Franzblau

[57] ABSTRACT

A discharge lamp ballast circuit comprises at least one discharge lamp connected in series circuit with a ballast capacitor and inductor across a pair of input terminals for a source of A.C. supply voltage. A controlled semiconductor switching element is coupled across the lamp electrodes and a control circuit for the switching element is coupled to the input terminals and to a control electrode of the switching element. A voltage dependent non-linear impedance device is connected in shunt with the capacitor so as to limit the capacitor voltage to a predetermined value. The voltage dependent impedance device prevents the occurrence of hazardous voltage levels in the circuit and improves the stability during the warm up phase.

14 Claims, 2 Drawing Figures

DISCHARGE LAMP BALLAST CIRCUIT

BACKGROUND OF THE INVENTION

This invention relates to ballast circuits for igniting and stabilizing the operation of one or more electric discharge lamps, and more particularly to a so-called hybrid ballast circuit having a high efficiency, improved starting characteristics and providing superior protection against the hazards of electrical shock.

One prior art hybrid ballast circuit arrangement is described in U.S. Pat. No. 3,997,814, issued Dec. 14, 1976 in the name of Makoto Toho. The basic operating circuit of the Toho device consists of the input supply voltage, a capacitor C, an inductor L and a discharge lamp connected in series circuit, and a semiconductor switch connected in shunt with the discharge lamp. This simplified form of the circuit is shown in FIG. 2 of the Toho patent and is described in column 2 of that patent. The semiconductor switch is actuated once in each half cycle of the A.C. supply voltage. This ballast circuit is compact in size and provides lamp ignition even with a supply voltage that is close to that of the lamp voltage.

A major disadvantage of the Toho system is that during the starting operation of a rapid start discharge tube the open circuit voltage applied across the tube electrodes may rise to such a high level as to cause the discharge tube to start instantaneously before the preheatable filament electrodes are heated to the proper operating temperature. It is well known that cold ignition of this type of discharge lamp is detrimental to the lamp life, i.e. the useful life of the discharge tube is reduced as a result of repeated ignitions thereof with insufficiently preheated filaments.

An improved version of the apparatus described in the Toho patent is presented in U.S. Pat. No. 4,253,043 which issued on Feb. 24, 1981 to H. M. J. Chermin et al. This patent discloses a hybrid ballast circuit provided with a voltage dependent resistor (VDR) connected in the gate control circuit of the semiconductor switch, e.g. a Triac, and arranged so that the Triac is triggered into conduction when the voltage applied to the discharge lamp, or lamps, reaches a predetermined level. The predetermined voltage level is chosen so as to prevent cold ignition of the lamps and thereby provides consistent rapid starting which is reliable and is not detrimental to the lamp life. As soon as the discharge lamps ignite, the VDR element reverts to its high impedance state so that it effectively has no further effect on the ballast circuit during operation of the lamps.

A second disadvantage of the ballast circuit described in the Toho patent is that in the event the discharge lamp does not start, but the lamp filaments are intact, the high starting current will continue to flow through the ballast circuit and will in time damage or destroy the ballast inductor and possibly other components of the apparatus. This problem is solved in the Chermin et al ballast apparatus by providing a positive temperature coefficient (PTC) resistor connected in series with the Triac switch. The PTC resistor is chosen and rated so that if the discharge lamp fails to ignite, the PTC resistor will be heated internally by the current, approximately 1.2 amps., and will shift from its low resistance state to its high resistance state after a predetermined period of time, for example, 30 seconds. A typical PTC resistor can switch from a low resistance value of 6 ohms, for example, to a resistance value of several thousand ohms when heated. It will thereby limit the current flow to a very low value and effectively shut down the system so as to prevent damage to any of the components.

It is a requirement of the U.S. National Electric Code that fluorescent fixtures used indoors be equipped with thermal protection. This has traditionally been accomplished by using bi-metal thermostats in the ballast. It is required that this thermal protection prevent the ballast from reaching excessive temperatures in the event of end-of-life faults of the ballast or in the event the ballast is installed in unacceptable conditions. The PTC element in this circuit also can be utilized to shut off the system in the event of such faults and/or improper application since it is sensitive to both current and temperature. The PTC resistor thus provides the thermal protection that present regulations require of a fluorescent ballast.

Although the ballast system disclosed by Chermin et al offers considerable improvement over the Toho apparatus, it too provides less than optimum results. An important limitation on both the Toho and Chermin et al apparatus is that they do not satisfy the safety requirements prevalent in the industry as to electric shock. In order to protect persons replacing a discharge lamp in a fixture from excessive electric shock, the Underwriter Laboratories specify certain maximum values of the RMS voltages present and the peak allowable voltage between a lamp socket and ground. The ballast circuits shown in the Toho and Chermin et al patents do not comply with this safety requirement thereby limiting their utility in a commercially acceptable ballast device.

A second possible area of improvement over the Chermin et al ballast relates to minimizing the power losses while avoiding instabilities of the system which manifest themselves as a flickering action during the warm-up or starting peiod of the lamp. This instability or flicker can be especially prominent when using the aforesaid ballast circuit with the 35 watt so-called energy saving type of discharge lamps which have a gas mixture containing krypton.

The lamp flicker occurs at a sub-harmonic of the AC supply frequency when starting such a discharge lamp. This instability or flicker may be of a violent nature under some circumstances and may be merely objectionable under other circumstances. The tendency towards instability of the particular discharge lamp is related to its temperature. If the lamps are started in a cool environment (for example 60° F.) the instability will tend to persist until the lamps warm up sufficiently. If the lamps are prevented from warming, for example by a cold draft blowing across them, then the instability can persist. Energy saver lamps also exhibit this tendency with conventional ballast devices during start-up, but the instability usually disappears very quickly.

Our analysis of the flicker problem indicates that it is caused by a partial lamp rectification that takes place during lamp start-up and which tends to allow more current to flow in one direction than in the other. This flicker usually occurs after a lamp ignites because the lamp does not reignite sufficiently during one-half cycle of the A.C. supply voltage. As a result an imbalance occurs in the system to produce an excessive build-up voltage on the ballast capacitor during one-half cycle and a very substantial lamp current then flows in the next successive half cycle. The voltage across the capacitor increases in the one direction until it reaches a level where, together with the A.C. supply voltage, it causes the lamps to conduct, thereby producing a very bright flash of light. This action repeats and results in the objectionable flicker referred to above.

Tests have shown that lamp flicker can be reduced and stable lamp operation provided by increasing the size of the inductance in series with the capacitor and the lamp since the larger inductance provides an additional smoothing of the lamp current and thus prevents or at least minimizes any flickering. This solution, although it provides more stable lamp operation during the start-up period, is objectionable in that it requires an inductor of greater size and cost and which causes greater energy losses.

A ballast device having certain improved operating characteristics over the ballast disclosed in the Chermin et al patent is described in U.S. application Ser. No. 207,321, filed Nov. 17, 1980, now U.S. Pat. No. 4,380,719

SUMMARY OF THE INVENTION

Accordingly, it is one object of this invention to provide a novel ballast circuit that will operate with a smaller ballast inductor and thereby reduce the power loss to a minimum value.

Another object of this invention is to provide a novel ballast circuit that produces flicker-free operation of a discharge lamp during the start-up period.

Another object of this invention is to provide a novel ballast circuit that automatically limits the voltage levels appearing at the discharge lamp electrodes to maximum values that do not present a hazard of electric shock to persons replacing a lamp.

A further object of the invention is to provide a ballast circuit which prevents premature starting of discharge lamps with preheatable filament electrodes before the filaments have been heated to their proper operating temperature.

Yet another object of the invention is to provide a novel lightweight, compact, and quiet ballast device that will operate with a discharge lamp or lamps having a total arc voltage that is greater than the A.C. supply voltage.

Another object of the invention is to provide a novel ballast device that will comply with the applicable thermal protection requirements without the use of a moving contact thermal switch.

Another object of the invention is to provide a novel ballast device that provides continuous filament heating for more than two filaments utilizing a current transformer to supply the heating to the additional filaments.

These and other objects of the invention are achieved by providing a hybrid ballast circuit that employs a voltage dependent non-linear resistor, more particularly a varistor or equivalent device, to limit the peak voltage produced across the ballast capacitor to a predetermined level that eliminates the problem of lamp flicker during the start-up phase, and also limits the maximum voltage appearing between any lamp electrode and ground to a safe value.

BRIEF DESCRIPTION OF THE DRAWINGS

A more complete understanding of the invention and its many attendant advantages will become apparent from the following detailed description thereof taken in conjunction with the accompanying drawings, in which.

DESCRIPTION OF THE PREFERRED EMBODIMENTS

Figure 1:
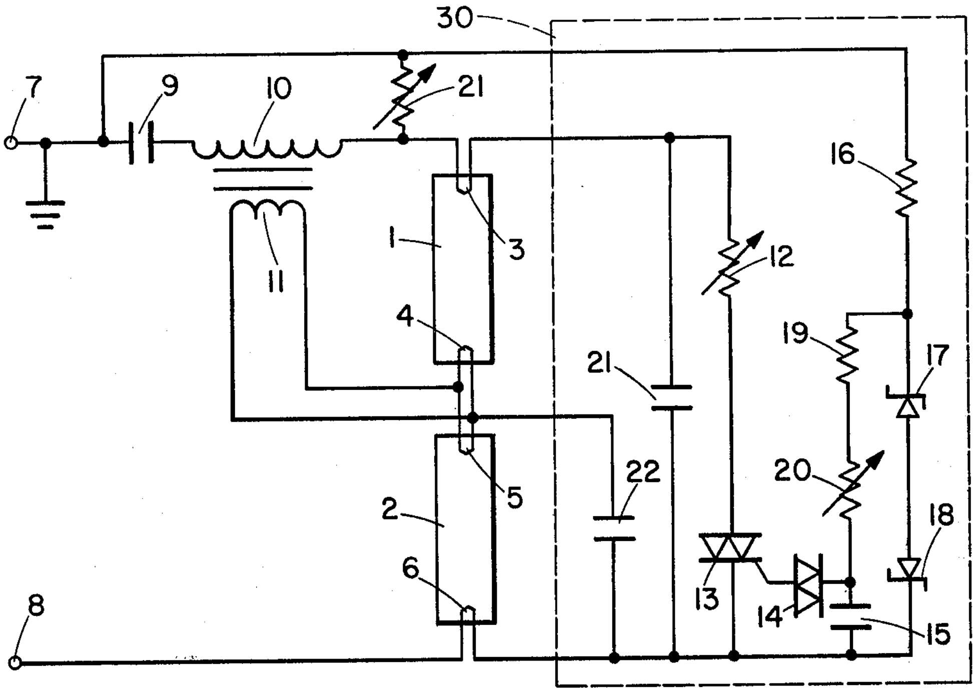
FIG. 1 is a circuit diagram of an improved ballast circuit in accordance with the invention.

Referring now to the drawings wherein like reference numerals designate identical or corresponding parts in the different figures, and more particularly to FIG. 1 thereof, a hybrid ballast circuit is shown for igniting and operating a pair of series-connected discharge lamps 1 and 2. The lamps 1 and 2 include preheatable filament electrodes 3, 4 and 5, 6, respectively. The discharge lamps are energized from a pair of input terminals 7 and 8 that are intended for connection to a source of A.C. supply voltage of 120 volts at a frequency of 60 Hz. Terminal 7 is connected to the ground side of the A.C. supply voltage and terminal 8 is the "hot" terminal. A ballast consisting of a capacitor 9 and an inductor 10 is connected in series circuit with the lamps 1 and 2 across the input supply terminals 7 and 8.

The "center" filaments 4 and 5 of the lamps are heated by means of a secondary winding 11 magnetically coupled to the inductor 10 so as to supply a continuous heating current thereto. The number of turns of this winding is chosen so that all four lamp filaments receive approximately the same preheat power.

The center filaments 4 and 5 are connected in parallel across the output of winding 11. They could also be connected in series and accomplish the same function but the external ballast wiring would be different from conventional fluorescent ballasts and result in field adaptability problems. Since the winding 11 is coupled to the inductor 10, the heating power delivered to filaments 4 and 5 will vary in accordance with the input current through inductor 10. As a result a higher power level is supplied for preheat purposes prior to lamp starting than for continuous operation after the lamps have started. A proper choice of design values allows optimum levels to be made available for proper starting and for operation such that the continuous power is adequate to allow normal lamp life, but is low enough to minimize the power consumption.

The outer electrodes 3 and 6 of the lamps are interconnected by means of the series arrangement of a positive temperature coefficient (PTC) resistor 12 and a bidirectional semiconductor controlled switching device 13, e.g. a Triac. In the event that the lamps do not start, but the filaments are intact, a high starting current would otherwise continue to flow through the circuit and would eventually damage or destroy the ballast inductor and possibly other circuit components. The PTC resistor 12, however, will be heated by this current and will switch from its low resistance state to its high resistance state after a predetermined period of time, thereby limiting the current to a very low value that will prevent any damage to the circuit components.

A control electrode of the semiconductor switching element 13 is connected to the electrode 6 of lamp 2 via the series arrangement of a semiconductor bidirectional voltage breakdown element 14, e.g. a silicon bilateral switch, and a capacitor 15. A series circuit consisting of a resistor 16 and back-to-back zener diodes 17 and 18 is connected between the input terminal 7 and the electrode 6 of lamp 2. The junction point between resistor 16 and zener diode 17 is connected to the junction point between the semiconductor breakdown element 14 and capacitor 15 via a series arrangement of a resistor 19 and a resistor 20, which may be variable to adjust the phase angle.

A radio frequency interference filter capacitor 21 is connected across the other electrodes 3 and 6 of the lamps, but is not critical to the operation of the circuit. A capacitor 22 is connected in shunt with the lamp 2. This is the well known starting capacitor that allows the lamps to start in a sequential manner thereby reducing the value of the starting voltage that would otherwise be required to start the lamps. The ballast circuit described so far is somewhat similar in structure and operation to the ballast circuit of U.S. Pat. No. 4,253,043 mentioned above. That prior art ballast apparatus, as well as the ballast device of the Toho patent (U.S. Pat. No. 3,997,814), exhibit peak voltages to ground that do not meet the Underwriters Laboratories safety requirements. These regulations require that a person replacing a lamp in a fixture, e.g. a rapid start lamp, be able to touch the pins on one end of the lamp while the other end is inserted in the socket, and not be subjected to a dangerous electric shock. The standard enunciated is that the voltage between a socket and ground must be limited to a maximum value of 180 volts RMS and 325 volts peak.

In the ballast circuit of FIG. 1, the only socket voltage to ground that presents a threat is the voltage at the socket for electrode 3. The socket for electrode 6 is at a line voltage of 120 volts RMS, 170 volts peak, to ground and is therefore within the prescribed safety limits. The voltage on either of the sockets for the inner electrodes 4 or 5 is not important because if a person is holding either electrode 3 or electrode 6, then the circuit is not operative. In other words, if either lamp is removed from its end socket, i.e. sockets 3 or 6, there is no current path for resonant charging of capacitor 9 so that the highest socket voltage that can occur is once again the line voltage. However, in the ballast circuit of U.S. Pat. No. 4,253,043, a voltage in excess of 400 volts peak can occur in the circuit between the socket for electrode 3 and ground when the electrode 4 of lamp 1 is removed from its socket.

The present invention overcomes the above-described dangerous condition by the provision of a voltage dependent non-linear resistance element, for example, a varistor device 21, connected between input terminal 7 and the junction point between the inductor 10 and the electrode 3 of lamp 1. It is also possible to use one or more zener diode or equivalent devices and a small series connected current limiting resistor in place of the varistor 21. The presence of the varistor in the circuit as shown limits the maximum voltage available between the lamp socket for electrode 3 and ground. As will be discussed in detail later on, the varistor also provides considerable improvement in the stability of the system when a cold lamp is being operated, as in its initial warm-up period.

The components 14–20 form a control circuit for the Triac 13 and combine to deliver a trigger pulse to the gate electrode thereof at a fixed time during each half cycle of A.C. supply voltage. The zener diodes 17 and 18 clip the peaks of the input A.C. voltage waveform to provide a square wave reference voltage of stable amplitude for capacitor 15 despite variations in the level of the A.C. supply voltage.

The capacitor 15 will be charged alternately in each half cycle of the A.C. supply voltage via a series arrangement of resistors 16, 19 and 20. Beginning with the first complete half cycle of the input supply voltage, the trigger network delivers a gate pulse from the capacitor 15 to the Triac 13 via semiconductor switch 14 at a fixed point in each half cycle thereof. This trigger pulse may occur typically 4.8 milliseconds (approximately 105 electrical degrees) after the beginning of the half cycle. The Triac 13 is turned on by the trigger pulse and provides a path for current to flow through the loop consisting of input terminals 7 and 8, capacitor 9, inductor 10, outer electrodes 3 and 6 of the lamps 1 and 2 and the PTC resistor 12. This current flow takes on a resonant charge form and thereby charges the capacitor 9 to a voltage level greater than the A.C. input voltage at terminals 7 and 8. The Triac turns off at the point in each half cycle when the current would tend to reverse, thus opening the circuit at the point in time of maximum voltage across capacitor 9.

During this start-up period the filament electrodes 3 and 6 are heated by the resonant charge current flowing therein during each half cycle. In one particular design the current flowing in the series loop was about 1.2 amps RMS. At the same time, the current flow in inductor 10 induces a voltage in secondary winding 11 so that the inner filament electrodes 4 and 5 of the lamps are also heated.

Each time the Triac turns off, the voltage stored on the capacitor 9 is added to the input supply voltage on an instantaneous basis to provide a voltage to start the lamps. The phase angles in the circuit are such that the principle starting voltage is the voltage on capacitor 9. The foregoing process continue until the discharge lamps 1 and 2 ignite. It is therefore clear that another advantage of the novel ballast system disclosed is that it will operate with one or more discharge lamps having a total arc voltage in excess of the A.C. supply voltage and without the need for a step-up transformer, thus providing a considerable saving in the cost and size of such a ballast system. In one particular embodiment tested, two 35 watt rapid start energy saver lamps having a total rated arc voltage of 166 volts were operated from a 120 volt input supply.

The connection of the varistor 21 so as to provide a shunt path around the capacitor 9 provides two important functions in the ballast circuit. First of all it limits the maximum voltage available between the socket for electrode 3 and ground to prevent the occurrence of dangerous voltage levels and thereby complies with the applicable safety regulations. The second important function is to reduce flicker and enhance the stability of the system.

In one embodiment, the values of the capacitance of capacitor 9 and the inductance of inductor 10, in combination with the firing angle of the Triac 13, have been selected so that the voltage appearing between outer electrodes 3 and 6 of the lamps is appropriate to start two 35 watt energy saver lamps, but will not normally allow them to instant start, even without the varistor 21 in the circuit. However, absent the varistor, a voltage is developed in the circuit that exceeds the safety requirements specified by the Underwriters Laboratories, more particularly the voltage to ground at the socket of electrode 3 exceeds 325 volts peak. The voltage dependent varistor 21 limits this voltage to a safe value by diverting the charging current away from capacitor 9 once a predetermined voltage level is reached. The voltages between electrode 3 and ground when the end 4 of lamp 1 is removed from the socket are about 250 volts peak and 180 volts RMS. The use of the varistor also results in a more consistent starting voltage across the discharge lamps. Thus, the use of the varistor and its particular connection in the circuit allows the ballast circuit to generate a sufficient voltage to meet the starting requirements of the discharge lamps while also complying with the prevalent safety requirements.

As mentioned above, the second important benefit of the invention concerns the improved stability of the system during the warm-up period of the lamps without sacrificing efficiency. One requirement of any discharge lamp ballast system is that it must apply a sufficient instantaneous voltage to reignite the lamps at the beginning of each half cycle because the arc is extinguished each time the lamp current passes through zero, and this current must be reestablished. The voltage necessary to reignite the lamps is a function of the lamp design itself, the temperature of the lamp, and the level of current flow that existed prior to the attempted reignition. In particular, the energy saver fluorescent lamps mentioned above contain a gas mixture that causes them to be particularly difficult to reignite, especially at their minimum allowable operating temperature of 60° F.

In the hybrid ballast circuit shown in FIG. 1, and with an inductance of 240 millihenries, a capacitance of 8.5 mfd and a Triac triggering time of 4.8 milliseconds, but without the varistor, the system will tend to become unstable a few seconds after starting if the lamp temperature is sufficiently low. This instability manifests itself as a violent flicker at a sub-harmonic frequency of 60 Hz. This flicker occurs because the lamp does not reignite sufficiently on one-half cycle so that an imbalance occurs in the system and thereby an excessive voltage is built-up on the capacitor during one-half cycle. A substantial lamp current then flows in the succeeding half cycle. This voltage build-up of course cannot continue indefinitely because of the capacitor characteristics and so the system will eventually wait through a complete half cycle with no lamp current flow and will then go through the same procedure all over again.

As mentioned above, tests show that lamp flicker can be reduced by increasing the inductance in series with the capacitor and lamp to provide a higher reignition voltage in each half cycle by causing the capacitor to charge up to a higher voltage. For example, the circuit described in the second embodiment of U.S. Pat. No. 4,253,043, when operated with the same input voltage and lamps as the circuit of FIG. 1 herein, utilizes an inductance of 0.33 Hy, as opposed to an inductance of only 0.24 Hy for the ballast circuit of the present invention. This 38% increase in the inductance of the former circuit generally provides stable operation of the lamps during the start-up period. However, it also requires an inductor of 38% greater size, cost and most importantly energy losses.

The varistor maintains stable lamp operation by limiting the maximum voltage to which the capacitor 9 can charge if there is a tendency towards flicker. In effect, this usually requires that the varistor voltage be chosen so that it will conduct insignificant current at the normal operating capacitor voltage but will clip it off at a value not far above normal. In one particular embodiment of the circuit of FIG. 1, a varistor device manufactured by the General Electric Company, Catalog No. V130LA20B, has been found to produce satisfactory results. The use of the combination described made it possible to achieve operation of two lamps which have nominal ratings of 35 watts each with a total loss of approximately 4 watts or less in the ballasting system.

Figure 2:
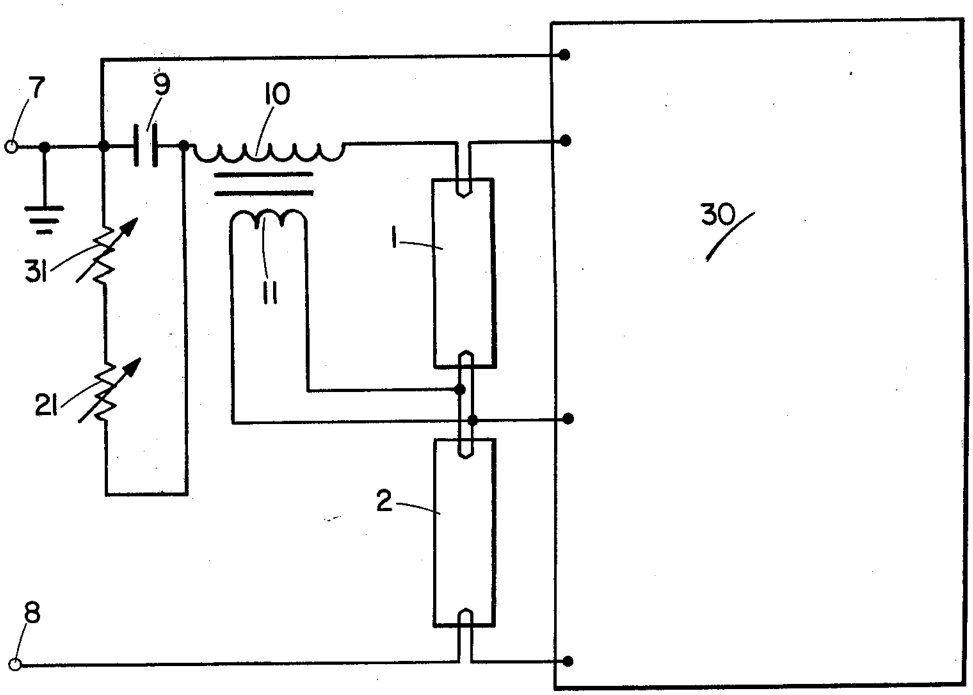
FIG. 2 is a circuit diagram of a modified form of the invention shown in FIG. 1.

FIG. 2 illustrates a second embodiment of the invention which provides all of the principal benefits described above in connection with the ballast apparatus of FIG. 1. In the interest of brevity, all of the circuit elements in the box 30 of FIG. 1 are contained in the box 30 of FIG. 2 and provide the same functions and operation as previously described. In the ballast circuit of FIG. 2, a PTC resistor 31 and a varistor 21 are connected in series and the series arrangement is in turn connected directly in parallel with the capacitor 9. The PTC resistor and the varistor are physically packaged tightly together so that the PTC resistor will be responsive to an increase in the temperature of the varistor.

It is also possible to obtain the principle benefits of the invention by connecting only the varistor 21 directly in parallel with the capacitor 9, that is by omitting the PTC resistor 31 from the circuit. This connection also effectively limits the charge on the capacitor 9 so that the safety voltage requirements are met. It is also a superior method from a standpoint of preventing lamp instability during warm-up. It's one disadvantage is that during the lamp warm-up, when there is a tendency towards instability, the varistor dissipates more power. If the lamps are in a 60° F. ambient environment and there is air movement across them preventing their bulb wall temperature from increasing, this power dissipation can continue for a long time. A device capable of dissipating the wattage involved for an extended period of time would have to be larger and more costly than the apparatus described in FIG. 1. There is also the danger that prolonged excessive heating of the varistor under these circumstances may damage it.

The device shown in FIG. 2, with the PTC resistor 31 in series with the varistor 21 and in good thermal coupling relationship therewith, will avoid this disadvantage and protect the varistor from damage caused by overheating. In this arrangement the varistor again serves to limit the capacitor charge to meet the safety requirements and to prevent the lamp instability. If the energy dissipation in the varistor persists sufficiently long to present a threat of damage to it, it will begin to heat up. The PTC resistor 31 packaged tightly with it will then sense the increase in the temperature and itself switch to a high resistance state, thus limiting the current and protecting the varistor. The combination of the PTC resistor 31 and varistor 21 can be arranged to minimize power losses in the varistor. After the discharge lamps have warmed up and stabilized, the heat developed by the current flow in the varistor can be used to raise the temperature of the PTC resistor 31 and thus introduce additional resistance into the varistor branch so as to limit the bypass current through the varistor. Other types of voltage dependent impedance elements which exhibit a reduction in impedance at higher voltage levels also could be used either directly across the capacitor or across the series combination of the capacitor and inductor.

Although specific embodiments of the invention have been illustrated and described herein, it will be obvious that various modifications and changes will occur to those skilled in the art. It is therefore to be understood that the appended claims are intended to cover all such modifications and changes as fall within the true spirit and scope of the invention.

What is claimed is:

1. A discharge lamp ballast device comprising, a pair of input terminals for connection to a source of A.C. supply voltage, a capacitor, an inductor, means for connecting the capacitor and the inductor in a series circuit with at least one electric discharge lamp across said pair of input terminals, a semiconductor switching element having a control electrode, means coupling said semiconductor switching element across the electrodes of said at least one discharge lamp, a control circuit coupled to said input terminals and to the control electrode of said semiconductor switching element for triggering the switching element into conduction during each half cycle of the A.C. supply voltage, and a voltage dependent non-linear impedance device connected in shunt with a part of said series circuit that includes at least the capacitor so as to limit the voltage to be developed across the capacitor to a predetermined value.

2. A ballast device as claimed in claim 1, wherein said voltage dependent impedance device comprises a varistor.

3. A ballast device as claimed in claims 1 or 2, wherein said voltage dependent impedance device is connected directly across the series connection of the capacitor and the inductor.

4. A ballast device as claimed in claims 1 or 2 wherein said voltage dependent impedance device is connected directly across the capacitor.

5. A ballast device as claimed in claim 4 further comprising a positive temperature coeffient (PTC) resistor electrically connected in series with said voltage dependent impedance device across the capacitor and located in good thermal coupling relationship with the voltage dependent impedance device so as to limit the current flow therein to a safe level.

6. A ballast device as claimed in claims 1 or 2 wherein said voltage dependent impedance device is connected directly across the series connection of the capacitor and the inductor, said capacitor and inductor being chosen to form a non-resonant series LC circuit at the frequency of the AC supply voltage, said device further comprising a positive temperature coefficient resistor connected in series with the semiconductor switching element across said discharge lamp electrodes so as to limit the flow of current in the event that the lamp fails to ignite.

7. A ballast device as claimed in claims 1 or 2 wherein said connecting means connects first and second series connected discharge lamps each having preheatable electrodes in said series circuit with said capacitor and said inductor, and said coupling means couples the semiconductor switching element to the outer electrodes of the first and second series connected lamps so that a preheat current can flow via the semiconductor switching element through said outer lamp electrodes from said input terminals during the start-up phase of the discharge lamp.

8. A ballast device as claimed in claim 7 further comprising a winding element inductively coupled to said inductor and electrically connected to the inner preheatable electrodes of the first and second discharge lamps to provide a heating current therefor in response to a flow of current in said inductor.

9. A ballast device as claimed in claim 7 wherein said voltage dependent impedance device is connected directly across the series connection of the capacitor and the inductor.

10. A ballast device as claimed in claim 7 wherein said voltage dependent impedance device is connected directly across the capacitor.

11. A ballast device as claimed in claim 10 further comprising a positive temperature coefficient (PTC) resistor electrically connected in series with said voltage dependent impedance device across the capacitor and located in good thermal coupling relationship with the voltage dependent impedance device so as to limit the current flow therein to a safe level.

12. A ballast device as claimed in claims 1 or 2 wherein the components of the control circuit are chosen so that during the operation of the discharge lamp the control circuit triggers the semiconductor switching element into conduction in the second half of each half cycle of the A.C. supply voltage.

13. A ballast device as claimed in claim 1 further comprising a positive temperature coefficient resistor electrically connected in series with the semiconductor switching element so as to provide thermal protection for the ballast device.

14. A ballast device for at least one electric discharge lamp having a preheatable electrode comprising, a pair of input terminals for connection to a source of AC supply voltage, a capacitor, an inductor, means for connecting the capacitor and the inductor in a series circuit with said electric discharge lamp across said pair of input terminals, a semiconductor switching element having a control electrode, means coupling said semiconductor switching element to said preheatable electrode and to another tube electrode included in said series circuit so that the switching element provides a preheat current path for said preheatable electrode, a control circuit having resistance means whose resistance is substantially independent of the voltage applied thereto, means coupling the control circuit to said input terminals and to the control electrode of said semiconductor switching element for triggering the switching element into conduction during each half cycle of the AC supply voltage, and a voltage dependent non-linear impedance device connected in shunt with a part of said series circuit that includes at least the capacitor so as to limit the voltage to be developed across the capacitor to a value that will prevent flickering of the lamp.

* * * * *